(12) United States Patent
Lavoie et al.

(10) Patent No.: US 12,247,518 B2
(45) Date of Patent: Mar. 11, 2025

(54) RETAINER AND METHOD FOR DISASSEMBLING AN AIRCRAFT ENGINE

(71) Applicant: PRATT & WHITNEY CANADA CORP., Longueuil (CA)

(72) Inventors: Louis Lavoie, Brampton (CA); Danny Noiseux, Longueuil (CA); Sean Wolczyk, Oakville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/140,708

(22) Filed: Apr. 28, 2023

(65) Prior Publication Data

US 2024/0360790 A1    Oct. 31, 2024

(51) Int. Cl.
*F02C 7/00* (2006.01)
*F02C 3/04* (2006.01)

(52) U.S. Cl.
CPC .................. *F02C 7/00* (2013.01); *F02C 3/04* (2013.01); *F05D 2230/70* (2013.01); *F05D 2260/30* (2013.01)

(58) Field of Classification Search
CPC .... F02C 3/14; F02C 7/00; F02C 7/042; F02C 7/068; F02C 7/06; F02C 7/14; F02C 7/10;

(Continued)

(56) References Cited

U.S. PATENT DOCUMENTS

| 2,971,334 A | * | 2/1961 | Carlson | F02C 3/06 |
| | | | | 60/726 |
| 3,997,962 A | * | 12/1976 | Kleitz | F01D 5/025 |
| | | | | 29/889.1 |

(Continued)

FOREIGN PATENT DOCUMENTS

| CN | 104903550 A | * | 9/2015 | ........... F01D 25/246 |
| CN | 216895057 U | * | 7/2022 | |

(Continued)

OTHER PUBLICATIONS

European Patent Office, Communication re. extended European search report for European patent application No. 24173183.5, Jul. 23, 2024.

*Primary Examiner* — Craig Kim
(74) *Attorney, Agent, or Firm* — Norton Rose Fulbright Canada LLP

(57) ABSTRACT

An assembly has: a gas turbine engine including: a compressor including a rotor including blades rotatable about a central axis and disposed in a gas path of the gas turbine engine, a stator including one or more vanes disposed in the gas path, and a compressor case disposed around the stator; a combustor downstream of the compressor along the gas path; and a combustor case surrounding the combustor and secured to the compressor case; and a retainer for interlocking the stator with the compressor case when disassembling the combustor case from the compressor case, the retainer including: a base secured to the compressor case; and a pin extending from the base and radially inwardly through the compressor case via an aperture defined in the compressor case, the pin engaging with the stator to prevent axial movement of the stator relative to the compressor case.

20 Claims, 7 Drawing Sheets

(58) Field of Classification Search
CPC ........ F02C 7/20; F01D 25/285; F01D 25/243; F01D 25/26; F01D 5/005; F01D 5/14; F01D 5/20; F04D 29/00; F04D 29/60
See application file for complete search history.

(56) References Cited

U.S. PATENT DOCUMENTS

| | | | | |
|---|---|---|---|---|
| 5,220,784 A * | 6/1993 | Wilcox | ................. | F01D 25/285 |
| | | | | 416/198 A |
| 5,297,932 A * | 3/1994 | Johnson | ................. | F04D 29/644 |
| | | | | 415/209.2 |
| 5,549,448 A * | 8/1996 | Langston | .............. | F01D 17/162 |
| | | | | 29/889.22 |
| 5,609,313 A * | 3/1997 | Cole | ....................... | B64D 29/00 |
| | | | | 244/54 |
| 5,653,581 A * | 8/1997 | Dixon | .................. | F01D 25/246 |
| | | | | 415/209.2 |
| 6,340,135 B1 * | 1/2002 | Barton | .................. | B64D 29/00 |
| | | | | 244/54 |
| 6,537,022 B1 * | 3/2003 | Housley | ................ | F01D 25/246 |
| | | | | 415/209.2 |
| 8,206,094 B2 * | 6/2012 | Seki | ...................... | F04D 29/542 |
| | | | | 415/191 |
| 8,327,648 B2 * | 12/2012 | Phillips | .................... | F23R 3/50 |
| | | | | 29/426.6 |
| 9,133,858 B2 * | 9/2015 | Macchia | .................. | F04D 1/14 |
| 10,167,738 B2 | 1/2019 | Hayford | | |
| 10,344,624 B2 * | 7/2019 | Mclaughlin | ............. | F16B 31/04 |
| 10,428,832 B2 * | 10/2019 | Lockhart | ................ | F01D 9/042 |
| 11,339,672 B2 * | 5/2022 | Murata | .................... | F02C 7/00 |
| 11,879,352 B2 * | 1/2024 | Hellard | ................ | F01D 25/285 |
| 2006/0045747 A1 * | 3/2006 | Martin | ................... | F04D 29/542 |
| | | | | 416/219 R |
| 2006/0153683 A1 * | 7/2006 | Dube | ................... | F01D 25/246 |
| | | | | 416/220 R |
| 2011/0005054 A1 * | 1/2011 | Maurell | ................ | F01D 25/285 |
| | | | | 29/428 |
| 2011/0293406 A1 * | 12/2011 | Abadie | ................ | F01D 17/162 |
| | | | | 29/889.2 |
| 2012/0195746 A1 | 8/2012 | Sarda | | |
| 2013/0276285 A1 * | 10/2013 | Macchia | ................... | F04D 1/14 |
| | | | | 29/426.5 |
| 2015/0125267 A1 | 5/2015 | Hatcher, Jr. | | |
| 2015/0369067 A1 * | 12/2015 | Pope | ....................... | F01D 25/28 |
| | | | | 415/208.1 |
| 2016/0040555 A1 * | 2/2016 | Hayford | ................ | F04D 29/023 |
| | | | | 415/214.1 |
| 2016/0208652 A1 * | 7/2016 | Rogers | .................... | F01D 9/042 |
| 2017/0152866 A1 * | 6/2017 | Griffin | .................. | F01D 11/127 |
| 2017/0282457 A1 * | 10/2017 | Burns | .................... | B33Y 30/00 |
| 2018/0073397 A1 | 3/2018 | Shirota | | |
| 2018/0112546 A1 * | 4/2018 | Griffin | .................... | F01D 9/042 |
| 2018/0340447 A1 * | 11/2018 | Karafillis | .............. | F01D 21/045 |
| 2019/0024531 A1 * | 1/2019 | Littler | ................... | F01D 17/162 |
| 2019/0112948 A1 * | 4/2019 | Shurrock | ............. | F01D 25/243 |
| 2020/0123919 A1 * | 4/2020 | Hall | ...................... | F01D 25/265 |
| 2020/0248579 A1 * | 8/2020 | Pratt | ...................... | F01D 25/246 |
| 2021/0079812 A1 * | 3/2021 | Troughton | .............. | F02C 7/222 |
| 2021/0387746 A1 * | 12/2021 | Danko | .................... | C23C 24/08 |
| 2022/0048647 A1 * | 2/2022 | Henriksen | ............ | F01D 25/285 |
| 2022/0243594 A1 | 8/2022 | Blaszczak | | |
| 2023/0265770 A1 * | 8/2023 | Yang | .................... | F01D 25/265 |
| | | | | 60/751 |
| 2024/0022126 A1 * | 1/2024 | Sanchez | ................ | H02K 1/2753 |

FOREIGN PATENT DOCUMENTS

| | | | | |
|---|---|---|---|---|
| EP | 3640440 A1 * | 4/2020 | ............ | F01D 25/24 |
| EP | 3712396 A1 | 9/2020 | | |
| EP | 3441579 B1 * | 6/2022 | .......... | F01D 25/243 |
| FR | 3115822 A1 | 5/2022 | | |
| JP | 2014066174 A | 4/2014 | | |
| WO | WO-2022264865 A1 * | 12/2022 | | |

* cited by examiner

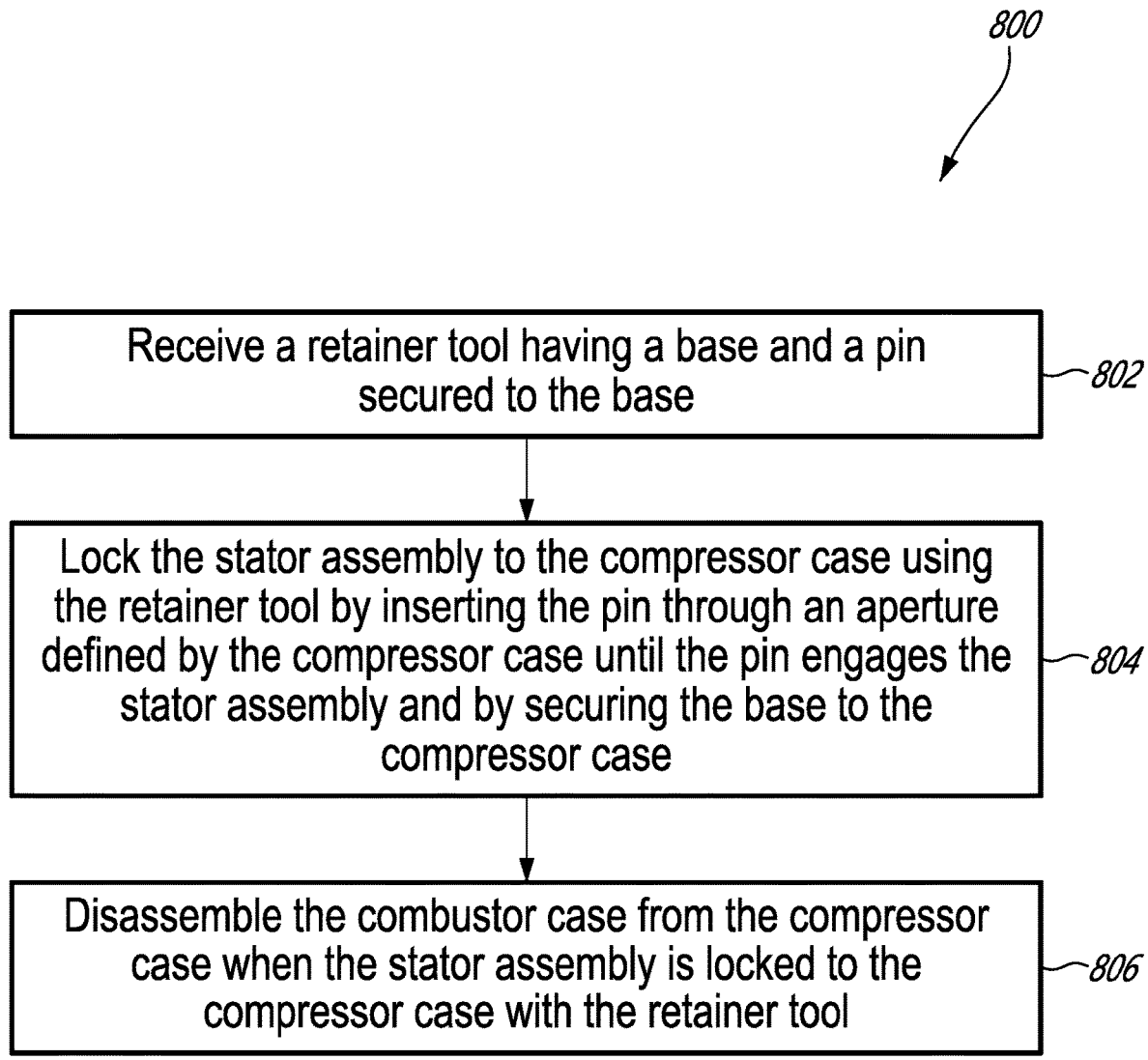

RETAINER AND METHOD FOR DISASSEMBLING AN AIRCRAFT ENGINE

TECHNICAL FIELD

The application relates generally to aircraft engines and, more particularly, to systems and methods used to disassemble parts of such aircraft engines.

BACKGROUND

Some gas turbine engines have a plurality of engine cases fastened together via flanges. In some situations, it may be required to disassemble the engine cases to replace and/or repair parts. However, in some configurations, a disassembly process may be impeded by other components of the gas turbine engine. Improvements are therefore sought.

SUMMARY

In one aspect, there is provided an assembly comprising: a gas turbine engine including: a compressor including a rotor including blades rotatable about a central axis and disposed in a gas path of the gas turbine engine, a stator including one or more vanes disposed in the gas path, and a compressor case disposed around the stator; a combustor downstream of the compressor along the gas path; and a combustor case surrounding the combustor and secured to the compressor case; and a retainer for interlocking the stator with the compressor case when disassembling the combustor case from the compressor case, the retainer including: a base secured to the compressor case; and a pin extending from the base and radially inwardly through the compressor case via an aperture defined in the compressor case, the pin engaging with the stator to prevent axial movement of the stator relative to the compressor case.

The assembly described above may include any of the following features, in any combinations.

In some embodiments, the pin is received into an opening defined in the stator, the pin abutting a peripheral wall of the opening.

In some embodiments, a transverse cross-sectional profile of the pin matches a shape of the opening of the stator.

In some embodiments, the opening of the stator and the aperture of the compressor case are at least partially in register with one another.

In some embodiments, the pin is received through the opening via a movement along a radial direction of the pin relative to the central axis.

In some embodiments, the base includes a first locating surface and the compressor case include a second locating surface engaged with the first locating surface to axially interlock the base with the compressor case.

In some embodiments, the first locating surface is a first peripheral face defined by the base and the second locating surface is a second peripheral face circumscribing the aperture.

In some embodiments, the base includes a peripheral flange protruding outwardly from the first peripheral face, the peripheral flange in abutment against the compressor case when the pin is received through an opening defined through the stator.

In some embodiments, the peripheral flange defines a hole in register with a threaded aperture defined by the compressor case, a fastener extending through the hole and threaded to the threaded aperture.

In some embodiments, the base is securable to the compressor case in a single relative orientation of the retainer relative to the compressor case.

In some embodiments, the compressor case includes a first flange and the combustor case includes a second flange securable to the first flange, a seal sandwiched between the first flange and the second flange.

In some embodiments, the aperture is one of a plurality of apertures circumferentially distributed about the central axis, the retainer is one of a plurality of retainers each having a respective pin received within a respective one of the plurality of apertures.

In another aspect, there is provided a method of disassembling a combustor case from a compressor case of a gas turbine engine, the compressor case surrounding a stator assembly, the method comprising: receiving a retainer tool having a base and a pin secured to the base; locking the stator assembly to the compressor case using the retainer tool by inserting the pin through an aperture defined by the compressor case until the pin engages the stator assembly and by securing the base to the compressor case; and disassembling the combustor case from the compressor case when the stator assembly is locked to the compressor case with the retainer tool.

The method described above may include any of the following features, in any combinations.

In some embodiments, the locking of the stator assembly to the compressor case includes inserting the pin through an opening of the stator assembly and abutting the pin against a peripheral wall of the opening.

In some embodiments, the opening of the stator assembly and the aperture of the compressor case are at least partially in register with one another.

In some embodiments, the method includes moving the retainer tool relative to the compressor case along a radial direction relative to a central axis of the gas turbine engine.

In some embodiments, the securing of the base to the compressor case includes axially locking the base to the compressor case by engaging a first locating surface of the base to a second locating surface of the compressor case.

In some embodiments, the engaging of the first locating surface to the second locating surface includes abutting a first peripheral face of the base to an aperture peripheral face of the aperture of the compressor case.

In some embodiments, the base includes a peripheral flange protruding outwardly from the first peripheral face, the method including abutting the peripheral flange against the compressor case when the pin is received through an opening defined through the stator assembly.

In yet another aspect, there is provided an aircraft engine repair tool for disassembling a compressor case from a combustor case of an aircraft engine, the aircraft engine having a stator assembly surrounded by the compressor case, the aircraft engine repair tool comprising: a base securable to the compressor case; and a pin extending from the base, the pin receivable through an aperture defined in the compressor case, the pin engageable with the stator assembly to prevent axial movement of the stator assembly relative to the compressor case.

BRIEF DESCRIPTION OF THE DRAWINGS

Reference is now made to the accompanying figures in which:

FIG. 8 is a flowchart illustrating steps of a method of disassembling a combustor case from a compressor case of the gas turbine engine of FIG. 1.

DETAILED DESCRIPTION

Figure 1:
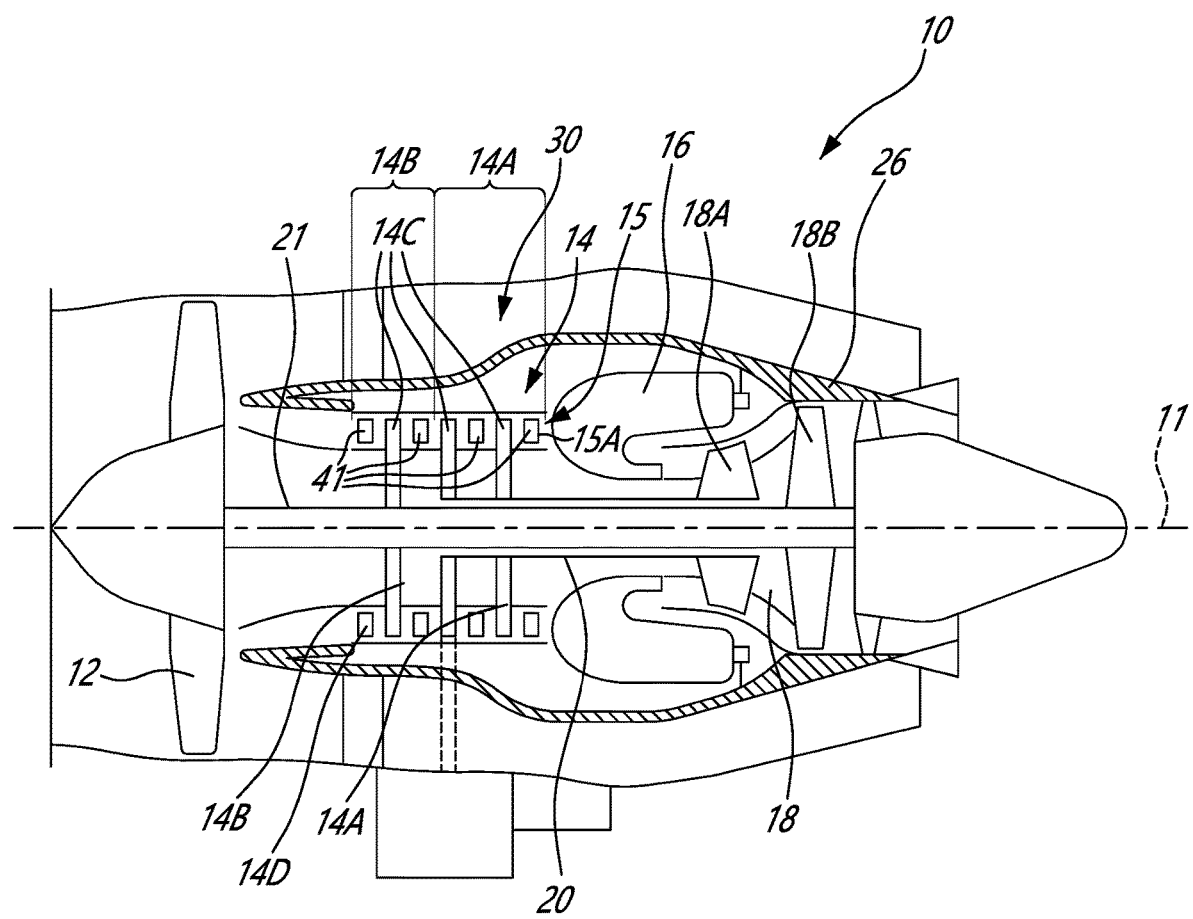
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor section 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section to a low-pressure compressor 14B of the compressor section 14 and drivingly engaged to the fan 12. It will be understood that the contents of the present disclosure may be applicable to other suitable engines, such as turboprops and turboshafts for example.

In the embodiment shown, both of the high-pressure compressor 14A and the low-pressure compressor 14B are axial compressors having successive rows of rotors 14C and stators. A diffuser 15 is located downstream of the high-pressure compressor 14A. The diffuser 15 may be vane diffuser having vanes 15A defining flow passages therebetween. Flow circulating area of the flow passages increase along a direction of the flow to reduce a velocity of the air and, therefore, increase its pressure before feeding said air to the combustor section 16.

Although illustrated as a turbofan engine, the gas turbine engine 10 may alternatively be another type of engine, for example a turboshaft engine, also generally comprising in serial flow communication a compressor section, a combustor, and a turbine section. A turboprop engine may also apply. In addition, although the gas turbine engine 10 is described herein for flight applications, it should be understood that other uses, such as industrial or the like, may apply.

The gas turbine engine 10 includes a case assembly 30 circumferentially extending around the central axis 11 and surrounding the compressor section 14, the combustor section 16, and the turbine section 18. The case assembly 30 provides structural integrity to the gas turbine engine 10 and is used to rotationally support the high-pressure shaft 20 and the low-pressure shaft 21. Put differently, loads are transferred from the high-pressure shaft 20 and the low-pressure shaft 21 to the case assembly 30 via bearings and structural members extending radially from those bearings to the case assembly 30. The case assembly 30 further define a radially outer boundary of a core flow path in which air and combustion gases flow. This core flow path is surrounded by a bypass flow path annularly extending around the case assembly 30 and extending radially between the case assembly 30 and an outer case or nacelle of the gas turbine engine 10.

Figure 2:
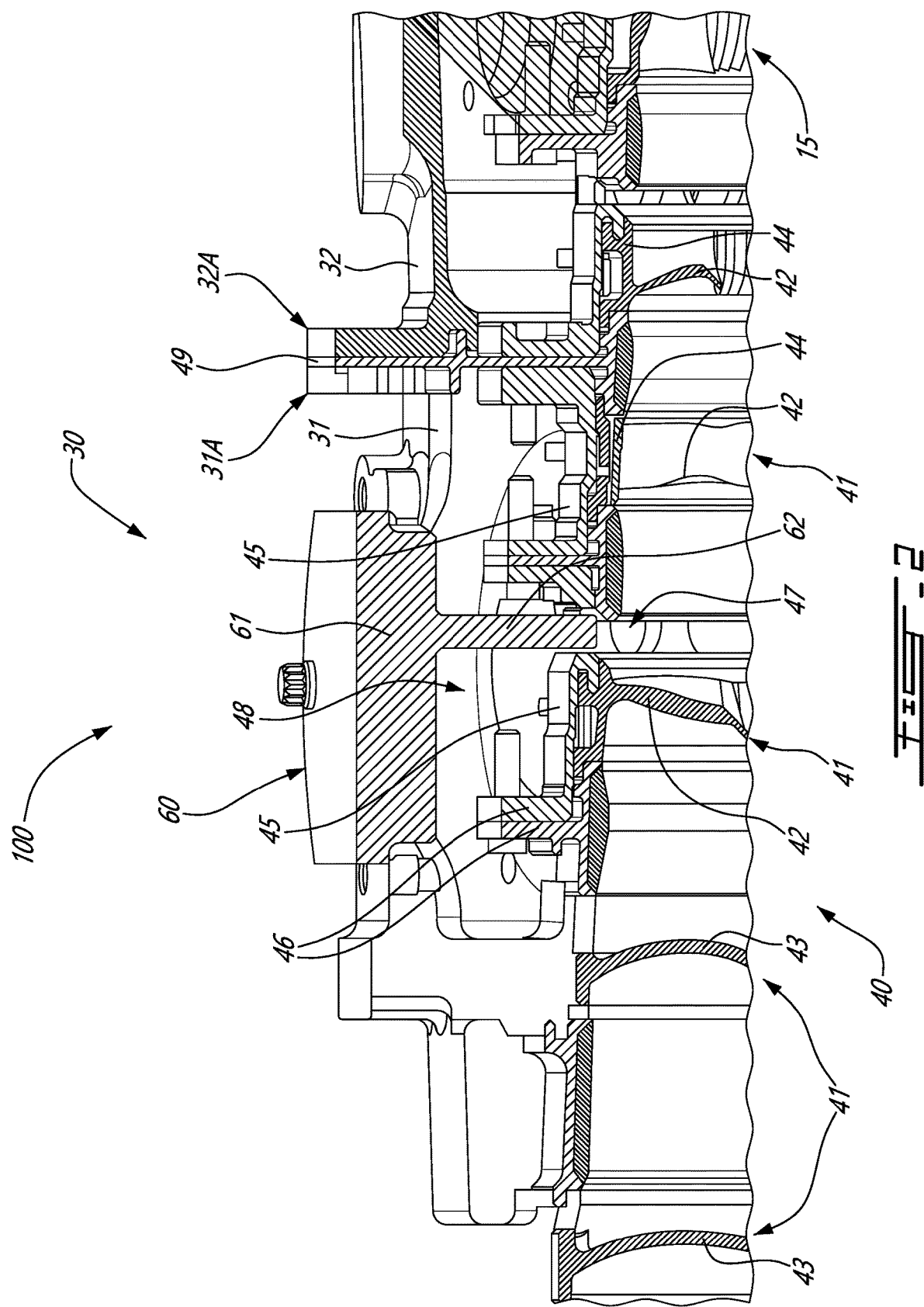
FIG. 2 is a three dimensional cutaway view of a portion of the gas turbine engine of FIG. 1.

Referring now to FIG. 2, an assembly 100 including a portion of the case assembly 30 and a retainer tool 60, also referred to as a retainer and as an aircraft engine repair tool, is shown. As illustrated, the case assembly 30 includes a compressor case 31 and a combustor case 32 secured to the compressor case 31. As will be explained, the retainer tool 60 is used while separating the combustor case 32 from the compressor case 31. In the present embodiment, the compressor case 31 includes a rear flange 31A and the combustor case 32 includes a fore flange 32A. The compressor case 31 is secured to the combustor case 32 via the rear flange 31A that is fastened (e.g., bolted) to the fore flange 32A of the combustor case 32. These flanges may extend annularly around the central axis 11 of the gas turbine engine 10.

The compressor section 14 includes the rotors 14C (FIG. 1) and a stator assembly 40, also referred to simply as a stator, secured to the case assembly 30. The stator assembly 40 include stator stages 41 interspaced between the rotors 14C (FIG. 1). In other words, the stator stages 41 and the rotors 14C are distributed in alternation (e.g., stator-rotor-stator . . . ) along the central axis 11. The rotors 14C include blades that are rotatable around the central axis 11 whereas the stator stages 41 include vanes 42 that are stationary relative to the central axis 11. Some of those vanes 42 may be guide vanes 43 in that they may rotate about respective spanwise axes to change a flow orientation, but they do not rotate about the central axis 11.

The vanes 42 extend generally radially between inner platforms (not shown) and outer shrouds 44 disposed at radially-outer ends of airfoils of the vanes 42. The outer shrouds 44 are secured to one another via shroud supports 45 axially distributed along the central axis 11 and fastened to one another via mating flanges 46. One of those shroud supports 45 define a plurality of openings 47 circumferentially distributed about the central axis 11. These openings 47 are used to allow bleeding of compressed air out of the compressor section 14 to feed other systems (e.g., pneumatic systems, environmental control systems, de-icing systems, etc) in need of compressed air. The openings 47 therefore provide fluid communication between the core flow path and a plenum 48 disposed radially between the stator assembly 40 and the compressor case 31. This plenum 48 may annularly extend fully around the central axis 11. The compressed air may then exit the plenum 48 via a plurality of apertures 31B (FIG. 3) defined through the compressor case 31 and circumferentially distributed around the central axis 11.

A seal 49 is disposed between (e.g., sandwiched) the rear flange 31A of the compressor case 31 and the fore flange 32A of the combustor case 32. The seal 49 is further disposed between mating flanges 46 of two adjacent ones of the shroud supports 45. The seal 49 may extend circumferentially all around the central axis 11 is used to prevent compressed air from leaking out of the plenum 48. The seal 49 therefore defines a rear boundary of the plenum 48.

Figure 3:
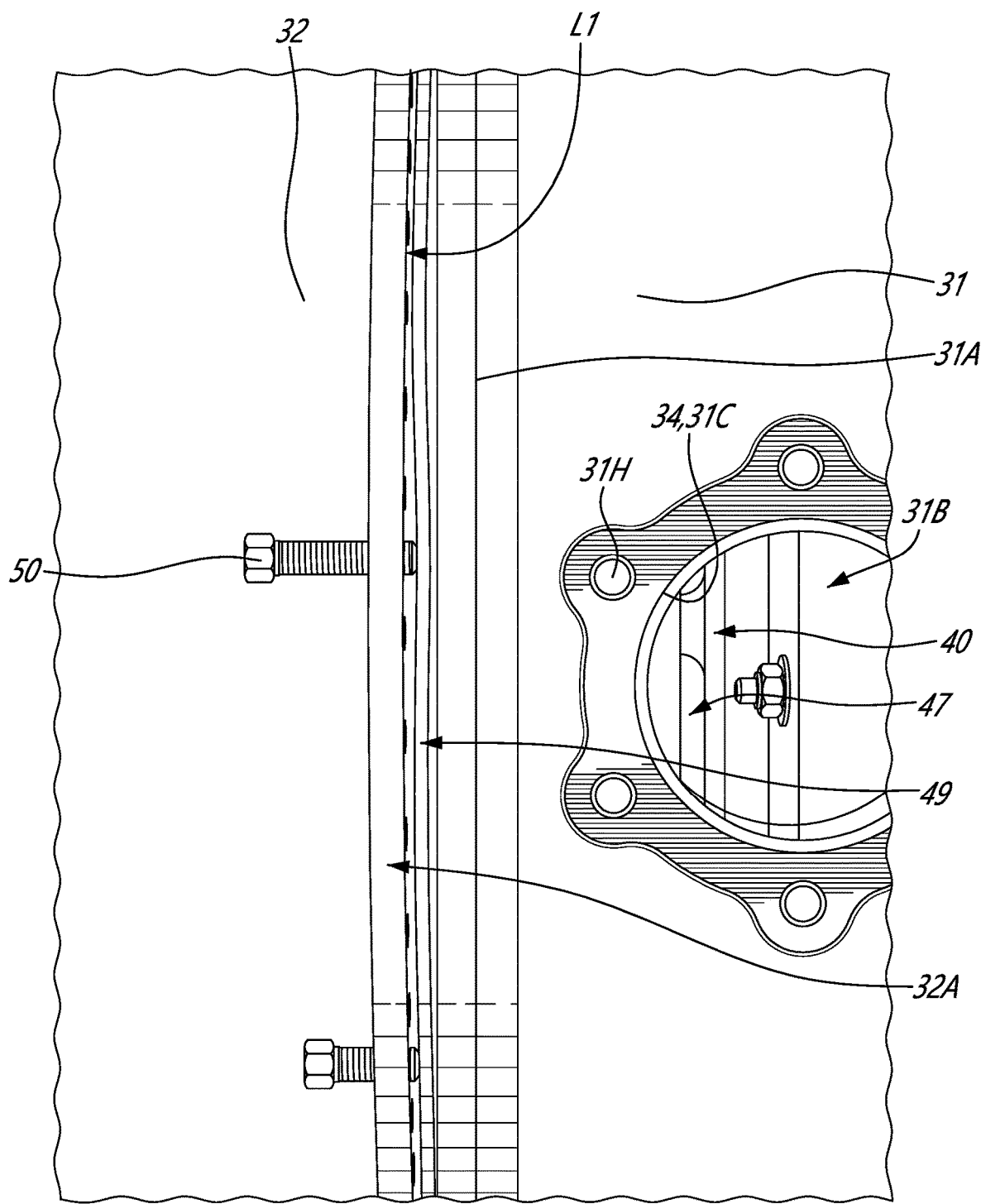
FIG. 3 is a top view of the portion of the gas turbine engine of FIG. 2.

Referring now to FIG. 3, in some situations, such as at overhaul of the gas turbine engine 10, it may be desired to disassemble the gas turbine engine 10. To do so, it may be required to separate the compressor case 31 from the combustor case 32. This may be performed using jack screws 50 (only one shows but a plurality may be used) threaded through correspondingly threaded apertures of the fore flange 32A of the combustor case 32. The jack screws 50 may be distributed around the central axis 11 and, as they are rotated about their respective longitudinal axes, they abut the seal 49 to axially move the compressor case 31 away from the combustor case 32. However, in some instances, the seal 49 may remain adhered or stuck to the fore flange 32A of the combustor case 32 at locations circumferentially between the jack screws 50. This is illustrated at location L1 in FIG. 3. The seal 49 therefore becomes waved and may undesirably induce a movement of the stator assembly 40 relative to the compressor case 31. This is problematic since relative movements of the stator assembly 40 with respect to the compressor case 31 may alter the fit of the stator assembly 40. It may also require the replacement of the seal 49 that is now deformed. It is preferred that the stator assembly 40 remains immobile relative to the compressor case 31 during this disassembly procedure.

The retainer tool 60 is used to maintain the stator assembly 40 immobile relative to the compressor case 31 during the disassembly procedure. In other words, the retainer tool 60 is used for retaining the stator assembly 40 relative to the compressor case 31 when axially moving the combustor case 32 relative to the compressor case 31 along the central axis 11. It will be appreciated that a plurality of retainer tools 60 may be used and distributed circumferentially to provide a uniform retaining force on the stator assembly 40. For the sake of clarity, the below description will use the singular form when describing the retainer tool 60.

Figure 4:
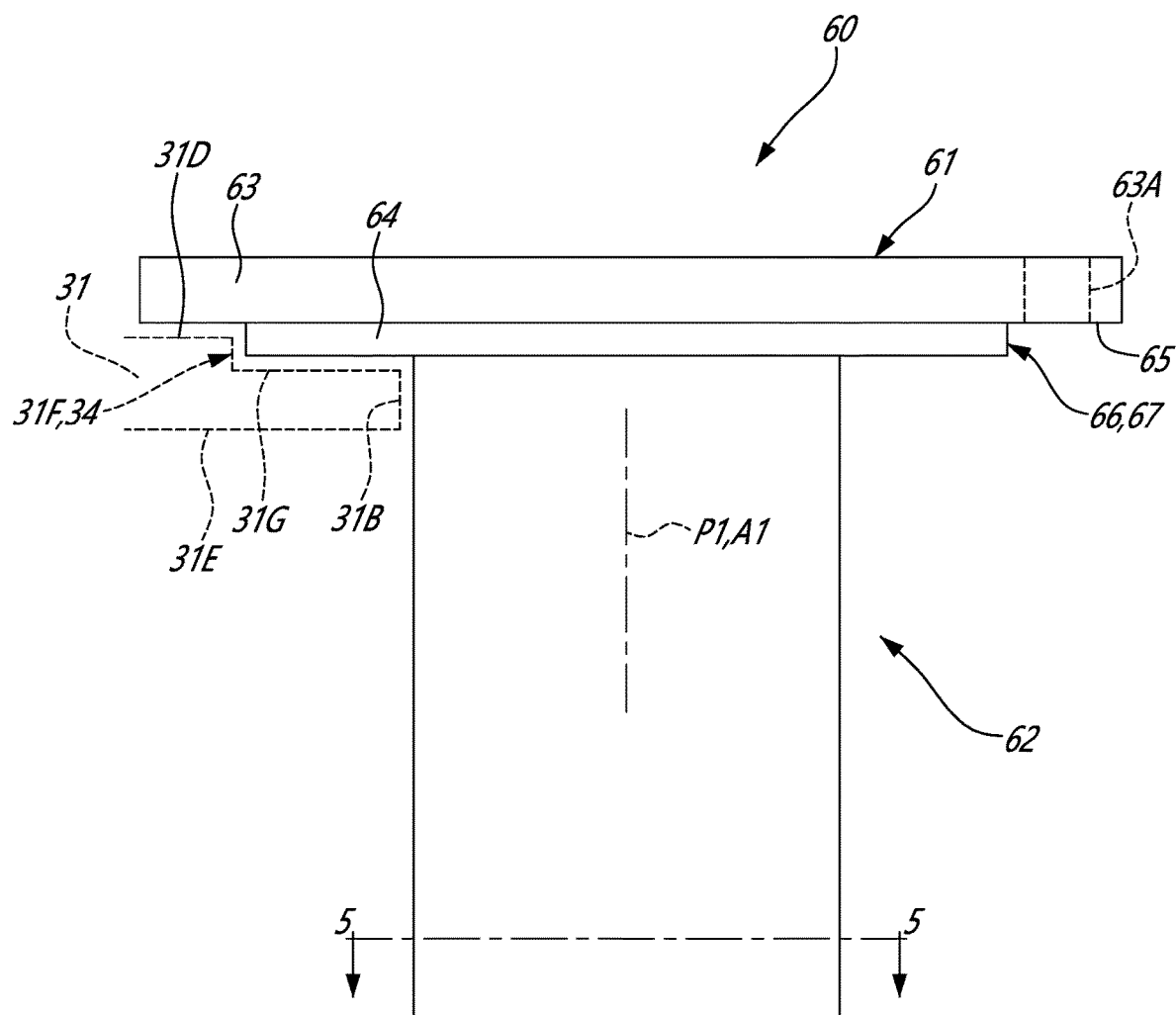
FIG. 4 is a front view of a retainer tool in accordance with one embodiment.

Referring more particularly to FIG. 4, the retainer tool 60 is described in more detail. The retainer tool 60 includes a base 61 securable to the compressor case 31 and a pin 62 extending from the base 61. The pin 62 is sized to be able to extend through the aperture 31B of the compressor case 31. As illustrated more clearly in FIG. 2, the pin 62 radially overlaps the stator assembly 40 and is in abutment against the stator assembly 40 to prevent axial movements of the stator assembly 40 relative to the compressor case 31. Put differently, the retainer tool 60 axially locks the compressor case 31 to the stator assembly 40. The retainer tool 60 is used for interlocking the stator assembly 40 with the compressor case 31 when disassembling the combustor case 32 from the compressor case 31.

Figure 6:
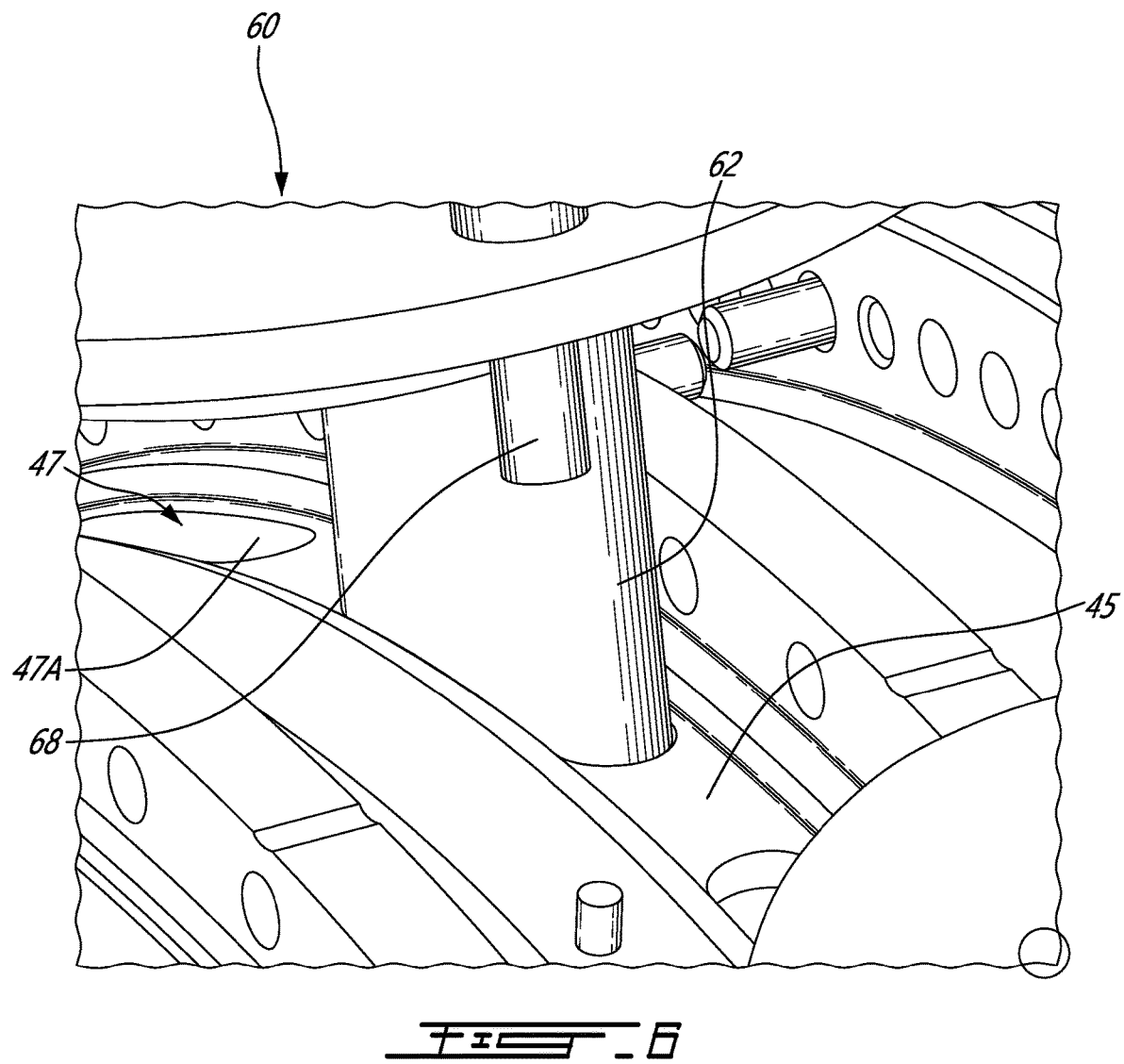
FIG. 6 is a partial cross-sectional view illustrating the retainer tool of FIG. 4 engaged to a stator assembly.

As depicted in FIGS. 3 and 6, which illustrates the retainer tool 60 and the stator assembly 40 with the compressor case 31 removed for illustration purposes, the pin 62 extends from the base 61 and radially inwardly through the compressor case 31 via one of the plurality of apertures 31B. The pin 62 engages with the stator assembly 40 to prevent axial movement of the stator assembly 40 relative to the compressor case 31. The pin 62 is received through the opening 47 defined by one of the shroud supports 45 of the stator assembly 40. The pin 62 thus abuts a peripheral wall 47A of the opening 47. The pin 62 therefore radially overlaps at least a portion of the peripheral wall 47A that circumscribes the opening 47. A stop is therefore created between the pin 62 and the stator assembly 40. The pin 62 may engage any suitable feature of the stator assembly 40 as long as it allows an axial retention of the stator assembly 40 relative to the compressor case 31. The pin 62 may engage a flange of the stator assembly 40 for instance.

Figure 5:
FIG. 5 is a cross-sectional view taken along line 5-5 on FIG. 4.

As illustrated in FIGS. 5 and 6, a transverse cross-sectional profile of the pin 62 has a matches a shape of the opening 47 of the stator assembly 40. This may further help in maintaining a position of the stator assembly 40 relative to the compressor case 31. Indeed, the pin 62, with its shape matching that of the opening 47, may circumferentially and axially lock the stator assembly to the compressor case 31. This may further lessen movements of the stator assembly 40 while removing the combustor case 32.

As more clearly illustrated in FIG. 3, the opening 47 of the stator assembly 40 and the aperture 31B defined through the compressor case 31 are at least partially in register with one another. In other words, the opening 47 is visible via the aperture 31B. There is thus a direct line of sight of the opening 47 via the aperture 31B. This may help maintenance personnel in inserting the retainer tool 60 at the appropriate location. More specifically, because of this direct line of sight, the pin 62 of the retainer tool 60 is received through the opening 47 of the stator assembly 40 via a movement along a radial direction relative to the central axis 11. The maintenance personnel may move the retainer tool 60 along a direction being solely radial relative to the central axis 11. This may facilitate the insertion of the retainer tool 60.

As shown in FIG. 4, in the presented embodiment, the base 61 includes a top plate 63 and a bottom plate 64 secured to the top plate 63. The pin 62 protrudes from the bottom plate 64 of the base 61. The bottom plate 64 is thus disposed between the top plate 63 and the pin 62. The top plate 63 extends radially outwardly beyond the bottom plate 64 relative to a pin axis P1 of the pin 62. The base 61 thus defines a peripheral flange 65, which corresponds to a portion of the top plate 63 that overhangs past the bottom plate 64. The bottom plate 64 has a first peripheral face 66 that intersects the peripheral flange 65 and that faces a generally radial direction relative to the pin axis P1.

FIG. 4 also illustrates a cross-section of the compressor case 31 with dashed lines to show how the retainer tool 60 is engaged to the compressor case 31. As shown, the aperture 31B defined through the compressor case 31 has a first section extending radially inwardly from an outer face 31D of the compressor case 31 and a second section extending from the first section to an inner face 31E of the compressor case 31. The first section has a cross-sectional area taken on a plane normal to an aperture axis A1 of the aperture 31B greater than that of the second section to define a step. Thus, the aperture 31B has an aperture peripheral face 31F that faces a radially inward direction relative to the aperture axis A1 of the aperture 31B. The aperture 31B of the compressor case 31 further defines a shoulder 31G that faces an axial direction relative to the aperture axis A1. Although the pin axis P1 and the aperture axis A1 appears as being coincident in FIG. 4, they may be offset from one another as will be discussed below.

The base 61 of the retainer tool 60 includes a first locating surface 67 engaging a second locating surface 34 on the compressor case 31. The base 61 is axially locked to the compressor case 31 via an engagement of the first locating surface 67 to the second locating surface 34. In the present embodiment, the first locating surface 67 corresponds to the first peripheral face 66 of the bottom plate 64 of the base 61 of the retainer tool 60 whereas the second locating surface 34 corresponds to the aperture peripheral face 31F. When the retainer tool 60 is properly seated, the aperture peripheral face 31F is abutted by the first peripheral face 66 of the base 61 of the retainer tool 60 to impede axial and circumferential motions of the retainer tool 60 relative to the central axis 11. The peripheral flange 65 of the base 61 abuts the outer face 31D of the compressor case 31 to impede movements of the retainer tool 60 along a radially inner direction relative to the central axis 11.

It will be appreciated that the first and second locating surfaces may be any means able to properly locate the retainer tool 60 relative to the compressor case 31. For instance, the first and second locating surfaces may correspond to a slot on one of the compressor case and the retainer tool and to a tab on the other of the compressor case and the retainer tool. In some embodiments, the first and second locating surfaces, although they may facilitate the installation of the retainer tool, may be omitted in some configurations.

As illustrated in FIG. 3, the opening 47 defined through the stator assembly 40 may be offset from the aperture axis A1 of the aperture 31B defined through the compressor case 31. Thus, the retainer tool 60 may be secured to the compressor case 31 in a single relative orientation. Put differently, the base 61 is securable to the compressor case 31 in a single relative orientation of the retainer tool 60 relative to the compressor case 31. Maintenance personnel may be require to rotate the retainer tool 60 about the pin axis P1 until the pin 62 is suitably aligned with the opening 47 in the stator assembly 40 such that the bottom plate 64 of the base 61 may be properly seated against the shoulder 31G (FIG. 4) of the aperture 31B of the compressor case 31. Markings may be provided on the top plate 63 of the base 61 to indicate how to orient the retainer tool 60.

Referring to FIGS. 4 and 6, the peripheral flange 65 defines a hole 63A, only one illustrated but more than one may be present, in register with a respective one of threaded apertures 31H (FIG. 3) defined by the compressor case 31. A fastener 68 extends through the hole 63A and is threaded in the threaded apertures 31H to maintain the retainer tool 60 secured to the compressor case 31.

Figure 7:
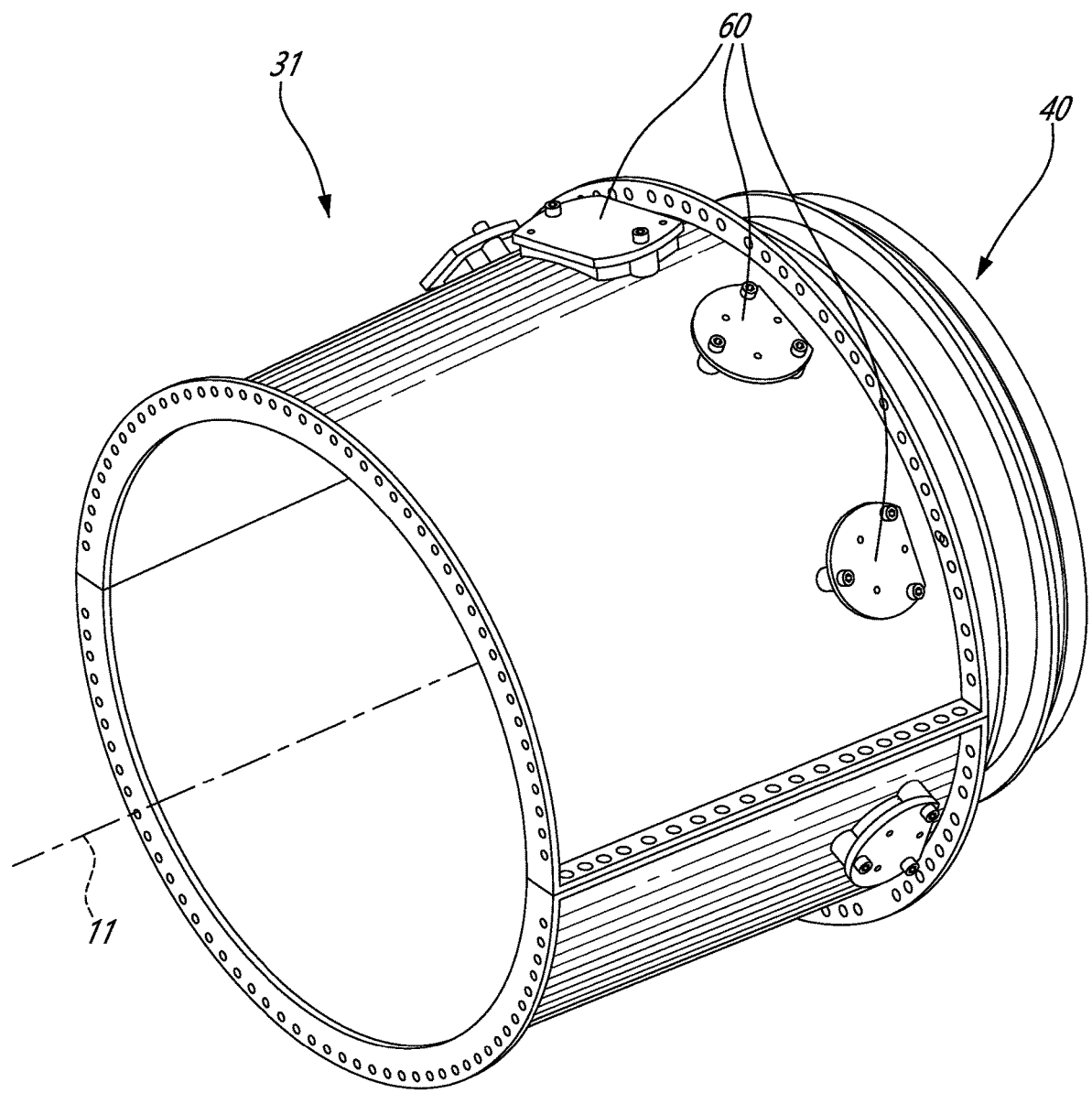
FIG. 7 is a three dimensional view illustrating a compressor case, the stator assembly of FIG. 6, and a plurality of retainer tools.

Referring now to FIG. 7, the compressor case 31 is shown with a plurality of retainer tools 60 secured to the compressor case 31 and engaged to the stator assembly 40. As illustrated, the retainer tools 60 are circumferentially distributed about the central axis 11. Each of the retainer tools 60 is received within a respective aperture (e.g., bleed hole) of the compressor case 31, secured to the compressor case 31, and engaged to the stator assembly 40. Thus, the plurality of retainer tools 60 may provide a substantially uniform retention force on the stator assembly 40 to prevent movements of the stator assembly 40 while disconnecting and removing the combustor case 32 (not shown in FIG. 7).

Each of the retainer tools 60 may have a respective base shaped to be mated with a respective bleed hole of the compressor case 31. In other words, each bleed hole may be different in size and shape since they are each configured to supply bleed air to a respective system of the gas turbine engine 10 or to a system of an aircraft equipped with the gas turbine engine 10. Thus, the assembly 100 may include a set of retainer tools each configured to engage a respective bleed aperture defined through the compressor case 31.

The disclosed retainer tools 60 may thus allow to suitably lock the stator assembly 40 and the compressor case 31 together to avoid altering a fit of the stator assembly 40 and/or deforming the seal 49 of the stator assembly 40 while removing the combustor case 32 during overhaul or other maintenance operations.

Referring now to FIG. 8, a method of disassembling the combustor case 32 from the compressor case 31 of the gas turbine engine 10 is shown at 800. The method 800 includes receiving the retainer tool 60 at 802; locking the stator assembly 40 to the compressor case 31 using the retainer tool 60 by inserting the pin 62 through the aperture 31B defined by the compressor case 31 until the pin 62 engages the stator assembly 40 and by securing the base 61 to the compressor case 31 at 804; and disassembling the combustor case 32 from the compressor case 31 when the stator assembly 40 is locked to the compressor case 31 with the retainer tool at 806.

In the present embodiment, the locking of the stator assembly 40 to the compressor case 31 at 804 includes inserting the pin 62 through the opening 47 of the stator assembly 40 and abutting the pin 62 against the peripheral wall 47A of the opening 47. The opening 47 of the stator assembly 40 and the aperture 31B of the compressor case 31 may be at least partially in register with one another. Thus, the method 800 includes moving the retainer tool 60 relative to the compressor case 31 along a radial direction relative to the central axis 11 of the gas turbine engine 10.

The securing of the base 61 to the compressor case 31 may include axially locking the base 61 to the compressor case 31 by engaging the first locating surface 67 to the second locating surface 34 of the compressor case 31. In the disclosed embodiment, the engaging of the first locating surface to the second locating surface includes abutting the first peripheral face 66 of the base 61 to the aperture peripheral face 31F of the aperture 31B of the compressor case 31. The method 800 may further includes including abutting the peripheral flange 65 of the retainer tool 60 against the compressor case 31 when the pin 62 is received through the opening 47 defined through the stator assembly 40. In some embodiments, the method 800 includes rotating the retainer tool 60 until the pin 62 is in register with the opening 47 defined by the stator assembly 40.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An assembly comprising:
   a gas turbine engine including:
     a compressor including a rotor including blades rotatable about a central axis and disposed in a gas path of the gas turbine engine, a stator including one or more vanes disposed in the gas path and shroud supports disposed outwardly of the one or more vanes, one or more of the shroud supports defining a bleed opening, and a compressor case disposed around the stator and outwardly of the shroud supports, a plenum disposed radially between the compressor case and the shroud supports, the bleed opening fluidly connecting the gas path to the plenum;
     a combustor downstream of the compressor along the gas path; and
     a combustor case surrounding the combustor and secured to the compressor case; and
   a retainer for interlocking the stator with the compressor case when disassembling the combustor case from the compressor case, the retainer including:
     a base secured to the compressor case; and
     a pin extending from the base and radially inwardly through the compressor case via an aperture defined in the compressor case, the pin received through the bleed opening to prevent axial movement of the stator relative to the compressor case.

2. The assembly of claim 1, wherein the pin abuts a peripheral wall of the bleed opening.

3. The assembly of claim 2, wherein a transverse cross-sectional profile of the pin matches a shape of the bleed opening of the stator.

4. The assembly of claim 2, wherein the bleed opening of the stator and the aperture of the compressor case are at least partially in register with one another.

5. The assembly of claim 4, wherein the pin is received through the bleed opening via a movement along a radial direction of the pin relative to the central axis.

6. The assembly of claim 1, wherein the base includes a first locating surface and the compressor case include a second locating surface engaged with the first locating surface to axially interlock the base with the compressor case.

7. The assembly of claim 6, wherein the first locating surface is a first peripheral face defined by the base and the second locating surface is a second peripheral face circumscribing the aperture.

8. The assembly of claim 7, wherein the base includes a peripheral flange protruding outwardly from the first peripheral face, the peripheral flange in abutment against the compressor case when the pin is received through the bleed opening defined through the stator.

9. The assembly of claim 8, wherein the peripheral flange defines a hole in register with a threaded aperture defined by the compressor case, a fastener extending through the hole and threaded to the threaded aperture.

10. The assembly of claim 1, wherein the base is securable to the compressor case in a single relative orientation of the retainer relative to the compressor case.

11. The assembly of claim 1, wherein the compressor case includes a first flange and the combustor case includes a second flange securable to the first flange, a seal sandwiched between the first flange and the second flange.

12. The assembly of claim 1, wherein the aperture is one of a plurality of apertures circumferentially distributed about the central axis, the retainer is one of a plurality of retainers each having a respective pin received within a respective one of the plurality of apertures.

13. An assembly comprising:
a gas turbine engine including:
a compressor including a rotor including blades rotatable about a central axis and disposed in a gas path of the gas turbine engine, a stator including one or more vanes disposed in the gas path, and a compressor case disposed around the stator;
a combustor downstream of the compressor along the gas path; and
a combustor case surrounding the combustor and secured to the compressor case; and
a retainer for interlocking the stator with the compressor case when disassembling the combustor case from the compressor case, the retainer including:
a base secured to the compressor case; and
a pin extending from the base and radially inwardly through the compressor case via an aperture defined in the compressor case, the pin engaging with the stator to prevent axial movement of the stator relative to the compressor case, the base including a first locating surface and the compressor case including a second locating surface engaged with the first locating surface to axially interlock the base with the compressor case.

14. The assembly of claim 13, wherein the first locating surface is a first peripheral face defined by the base and the second locating surface is a second peripheral face circumscribing the aperture.

15. The assembly of claim 14, wherein the base includes a peripheral flange protruding outwardly from the first peripheral face, the peripheral flange in abutment against the compressor case when the pin is received through an opening defined through the stator.

16. The assembly of claim 15, wherein the peripheral flange defines a hole in register with a threaded aperture defined by the compressor case, a fastener extending through the hole and threaded to the threaded aperture.

17. The assembly of claim 13, wherein the base is securable to the compressor case in a single relative orientation of the retainer relative to the compressor case.

18. The assembly of claim 13, wherein the compressor case includes a first flange and the combustor case includes a second flange securable to the first flange, a seal sandwiched between the first flange and the second flange.

19. The assembly of claim 13, wherein the aperture is one of a plurality of apertures circumferentially distributed about the central axis, the retainer is one of a plurality of retainers each having a respective pin received within a respective one of the plurality of apertures.

20. The assembly of claim 13, wherein the pin is received into an opening defined in the stator, the pin abutting a peripheral wall of the opening.

* * * * *